United States Patent
Erlingfors et al.

(10) Patent No.: US 8,152,345 B2
(45) Date of Patent: Apr. 10, 2012

(54) PEDESTRIAN SAFETY HEADLAMP ASSEMBLY

(75) Inventors: Mats Erlingfors, Jörlanda (SE); Anders Fredriksson, Göteborg (SE); Gunnar Hallneus, Göteborg (SE); Gert Walden, Älvängen (SE); Daniel Zugan, Göteborg (SE)

(73) Assignee: Volvo Car Corporation, Gothenburg (SE)

( * ) Notice: Subject to any disclaimer, the term of this patent is extended or adjusted under 35 U.S.C. 154(b) by 396 days.

(21) Appl. No.: 12/429,265

(22) Filed: Apr. 24, 2009

(65) Prior Publication Data
US 2009/0268482 A1 Oct. 29, 2009

(30) Foreign Application Priority Data
Apr. 24, 2008 (EP) .................... 08155097

(51) Int. Cl.
*F21V 5/00* (2006.01)
(52) U.S. Cl. ............ 362/520; 362/326; 362/546
(58) Field of Classification Search ........ 362/520, 362/21, 22, 326, 369, 390, 450, 455, 456, 362/507, 546; 296/187.04, 193.09
See application file for complete search history.

(56) References Cited

U.S. PATENT DOCUMENTS

| | | | | |
|---|---|---|---|---|
| 4,894,761 A | * | 1/1990 | Gray | 362/509 |
| 5,172,972 A | * | 12/1992 | Terao | 362/517 |
| 6,327,095 B1 | * | 12/2001 | Tamai et al. | 362/507 |
| 6,450,676 B2 | * | 9/2002 | Maeda et al. | 362/369 |
| 6,951,365 B2 | * | 10/2005 | Chase et al. | 296/187.03 |
| 7,040,793 B2 | * | 5/2006 | Chase | 362/369 |
| 7,128,461 B2 | * | 10/2006 | Hwang | 362/632 |
| 7,452,112 B2 | * | 11/2008 | Arlon | 362/507 |

FOREIGN PATENT DOCUMENTS

| | | |
|---|---|---|
| DE | 103 34 033 A1 | 2/2005 |
| DE | 10 2006 007449 A1 | 8/2007 |
| DE | 10 2006 047 420 A1 | 4/2008 |
| EP | 1 120 309 A2 | 8/2001 |
| EP | 1 400 404 A1 | 3/2004 |
| EP | 1 736 358 A1 | 12/2006 |
| EP | 1 886 870 A1 | 2/2008 |
| JP | 2005 280415 A | 10/2005 |
| JP | 2007 045351 A | 2/2007 |

OTHER PUBLICATIONS

EPO Machine Translation to English of Description of German Patent DE10334033 A1 dated Feb. 17, 2005 to Beugel et al, 2 pages.*

* cited by examiner

*Primary Examiner* — Alan Cariaso
(74) *Attorney, Agent, or Firm* — Brooks Kushman P.C.

(57) ABSTRACT

A headlamp assembly for an automotive vehicle includes a housing and a lens. At least one protrusion is located on or adjacent to the housing such that the protrusion and lens are urged together when the headlamp assembly is subjected to an impact, contact between the lens and the at least one protrusion initiating controlled deformation and/or breakage of the lens.

8 Claims, 2 Drawing Sheets

PEDESTRIAN SAFETY HEADLAMP ASSEMBLY

CROSS-REFERENCE TO RELATED APPLICATIONS

This application claims foreign priority benefits under 35 U.S.C. §119(a)-(d) to EP 08155097.2 filed Apr. 24, 2008, which is hereby incorporated by reference in its entirety.

BACKGROUND

1. Technical Field

The present invention relates to a headlamp assembly for a vehicle and specifically to such a headlamp assembly that reduces injury to a pedestrian struck by the vehicle.

2. Background Art

A headlamp is a lamp that is usually attached to the front of an automotive vehicle, such a car, with the purpose of illuminating the road ahead during periods of low visibility, such as during the night or in bad weather conditions and/or to increase the conspicuity of vehicles in motion during the daytime. A headlamp usually comprises a light source, a reflector and a cover with a front surface forming a lens. Normally, headlamps are positioned in pairs, one or more on each side of the front of a vehicle.

Some headlamps are designed so that the risk of injuries to a pedestrian is reduced in the event of a collision with a pedestrian.

For example, the abstract of German patent application no. DE 102006007449 describes a headlamp that is attached to a carrying element, whereby the headlamp and the carrying element are separated by a gap in order to facilitate the adjustment of the position of the headlamp. In case of a collision with a pedestrian, the headlamp unit is pushed into the gap towards the carrying element. Small segments protruding at from the surface of the carrying element create indents in the rear of the headlamp housing resulting in a reduction of the forces of the impact.

European patent no. EP 1 120 309 teaches a headlamp housing that has a front light output opening covered by a lamp glass. The headlamp housing has a side section that extends inwards from the light output opening and has at least one rupture point, i.e. a mechanically weakened deformable portion, designed for absorbing the force upon impact with a pedestrian. Parts of the headlamp housing on either side of the rupture point are arranged to be telescopically inter-fitting. Since such an arrangement leads to a local deformation only in the area of rupture point(s), the energy absorption of the headlamp is limited by the maximum possible deformation in the area of the rupture point(s).

SUMMARY

An object of the present invention is to provide a pedestrian-friendly headlamp assembly for an automotive vehicle, whereby the risk of injuries to a pedestrian is reduced in the event of a collision with the pedestrian.

The expression "pedestrian" as used in this document is intended to mean a human being or other living creature, and includes human beings using a vehicle, such as a bicycle or a motorbike, and is not therefore restricted to human beings moving on foot.

This object is achieved by a headlamp assembly that comprises a housing, a lens, and at least one protrusion disposed adjacent the lens such that the lens and the protrusion are urged together when the headlamp assembly is subjected to an impact or compression force in the event of a collision with a pedestrian. The forceful contact between the lens and the one protrusion initiates a controlled deformation and/or breakage of the lens. A stress concentration will occur at the point at which the at least one protrusion contacts the lens, which will result in the deformation/breakage of the lens if the impact force exceeds a predetermined magnitude.

The headlamp assembly therefore comprises at least one passive trigger to initiate controlled deformation and/or breakage of the lens since the present invention is based on the insight that a headlamp lens contributes to pedestrian injury during impacts and that the energy-absorbing capacity of a headlamp assembly can be increased by triggering the deformation/breakage of its lens. By providing a headlamp assembly with a readily deformable/breakable lens, the force exerted by the lens on a pedestrian in the event of a collision will be reduced, which may reduce the number of injuries suffered by a pedestrian or the severity of the injuries. Furthermore, the deformation/breakage of the lens will result in a smoother impact because of a low force level during initial impact and high energy absorption due to the high deformation/breakage of the lens.

Additionally, the headlamp assembly gives a designer maximum freedom to achieve an optimum design with regard to pedestrian protection with a very minor need for additional components and manufacturing efforts.

A further advantage is that since the lens is arranged to be deformed/broken rather than to be kept intact and displaced rearwards with or without the whole headlamp assembly, no substantial additional space behind the lens or headlamp assembly is necessarily required. The at least one protrusion and the lens may for example be arranged to be placed in contact with each other during the manufacture, installation or use of the headlamp assembly, or the at least one protrusion may be arranged to be spaced a small distance from a surface of the lens, whereby the lens and/or protrusion are arranged to be displaced through small distance in the event of a collision with a pedestrian.

The expression "lens" as used in this document is intended to mean a piece of transparent or semi-transparent material, which is optionally used to focus rays of light, i.e. the lens may merely be a cover for a lamp or light source. The lens may be curved or substantially flat and be of any shape or form. A headlamp may be arranged to comprise a plurality of such lenses. Alternatively a headlamp assembly may comprise a plurality of lamps or light sources and a single lens.

As regards the expression "deformation/breakage"; whether a lens deforms and/or breaks will depend on the physical properties of the material from which the lens is made and the magnitude of the impact/compression forces to which it is subjected in the event of a collision. The lens material and the design and location of the protrusions may be selected so as to achieve the desired deformation/breakage for a particular impact or compression force.

It should be noted that the at least one "protrusion" may be arranged to "protrude" only in the event of a collision. For example, at least one protrusion may be arranged inside a plastically deformable material located between a headlamp housing and a lens for example, whereby the softer plastically deformable material is arranged to be displaced to reveal the at least one protrusion in the event of a collision.

According to an embodiment of the invention the at least one protrusion is provided on the housing. It should be noted that part of a vehicle comprising a headlamp assembly according to the present invention may constitute at least part of the headlamp assembly housing.

According to another embodiment of the invention the lens comprises at least one break line, i.e. at least one weakened area, such as an area of reduced thickness, in order to promote breakage of the lens in the at least one weakened area, whereby the at least one protrusion is arranged in the vicinity of the at least one break line.

According to a further embodiment of the invention the lens comprises at least one groove that is arranged to receive the at least one protrusion if/when the headlamp assembly is subjected to an impact or compression force in the event of a collision According to an embodiment of the invention the at least one groove and the at least one protrusion have a maximum extension, and the maximum extension of the at least one groove is smaller than the maximum extension of the at least one protrusion.

According to another embodiment of the invention the lens comprises a flange, such as a glue flange, and the at least one groove is provided on the flange.

According to a further embodiment of the invention the lens comprises at least one continuous or non-continuous, uniform or non-uniform film, layer or coating that is arranged to prevent parts of a broken lens from being scattered if/when the headlamp assembly or the lens is subjected to an impact or compression force in the event of a collision resulting in breakage of the lens. The risk that a relatively sharp edge of the broken lens may injure the pedestrian, a person at the scene of the collision or a person repairing or replacing the headlamp assembly is thereby reduced.

According to an embodiment of the invention the lens comprises plastic or is made entirely of plastic.

The present invention also concerns a lens that is suitable for use in a headlamp assembly according to the present invention.

The present invention is particularly, but not exclusively, intended for use in passenger cars, trucks, buses, heavy goods vehicles or any other road-using vehicle or moving object.

The present invention further concerns a vehicle comprising a headlamp assembly that comprises a housing and a lens, whereby the vehicle comprises a vehicle component, other than a headlamp, that comprises at least one protrusion that is arranged to be pushed into the lens, or whereby the lens is arranged to be pushed against the at least one protrusion, to initiate controlled deformation and/or breakage of the lens if/when the vehicle component is subjected to an impact or compression force in the event of a collision.

According to an embodiment of the invention the at least one protrusion is provided on a vehicle component that is located in the vicinity of the lens, such as a hood or a fender.

BRIEF DESCRIPTION OF THE DRAWINGS

The present invention will hereinafter be further explained by means of non-limiting examples with reference to the appended Figures where.

DETAILED DESCRIPTION

Figure 1:
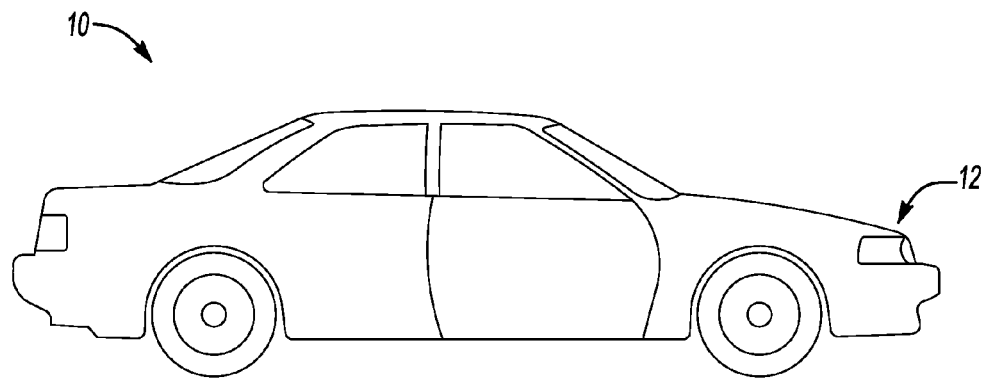
FIG. 1 shows a vehicle according to an embodiment of the invention.

FIG. 1 shows a vehicle 10 comprising a headlamp assembly 12. The headlamp assembly 12 may comprise any type of lamp, such as a reflector lamp in which a light source is placed at or near the focus of a reflector, or a projector lamp in which a light source is located at one focus of an ellipsoidal reflector and has a condenser lens at the front of the lamp. A light source may for example be a tungsten filament bulb, a halogen filament bulb, a gas discharge lamp or a light emitting diode.

Figure 2:
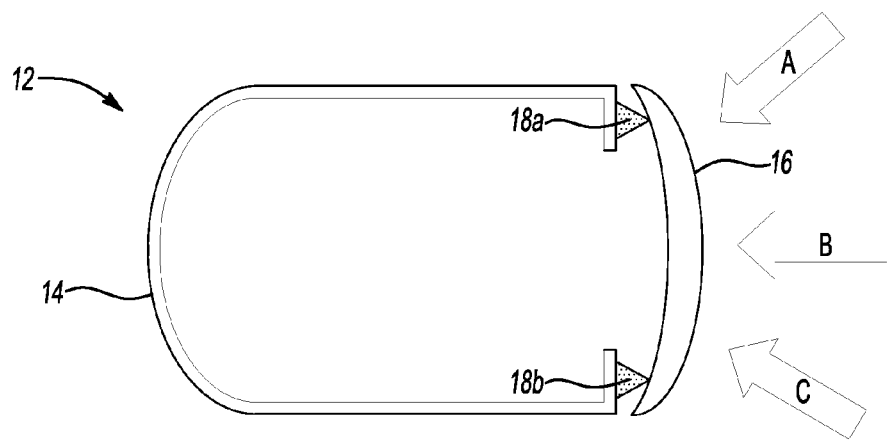
FIG. 2 shows a headlamp assembly according to a first embodiment of the invention.

FIG. 2 shows a headlamp assembly 12 according to an embodiment of the invention, which comprises a housing 14 and a lens 16 comprising clear plastic or glass for example. The housing 14 comprises a plurality of protrusions 18$a$, 18$b$ that are arranged in contact with or immediately adjacent the back surface of the lens 16. Lens 16 and protrusions 18$a$, 18$b$ are disposed relative to one another such that when the headlamp assembly 12 is subjected to an impact or compression force that acts generally rearward (for example as indicated by block arrows labelled A, B, and C) the lens is pushed against the protrusions 18$a$, 18$b$ to initiate deformation and/or breakage of the lens 2. In the illustrated embodiment, the protrusions 18$a$, 18$b$, are provided on the housing 14 and may either be integrally formed with the housing 14, which may reduce manufacturing and assembly complexity and costs, or mounted directly or indirectly thereon.

The housing 14 and the lens 16 may be separate parts, whereby the lens 16 is attached to the housing by any conventional means, such as via adhesion, such that in the event that the lens 16 becomes broken or deformed it may easily be replaced without having to replace the entire headlamp assembly, which reduces repair costs and complexity. The housing 14 may for example be, at least in part, constituted by a cavity in the chassis of a vehicle. Alternatively, the housing 14 and the lens 16 may be made out of the same material and may optionally be formed as an integrated unit. In the latter case the lens 16 is the part of the headlamp 12 that a pedestrian may make contact with in the event of a collision. The headlamp assembly according to the invention is namely arranged so that it is the part of a lens with which a pedestrian may make contact in the event of a collision that is arranged to break or deform.

Figure 3:
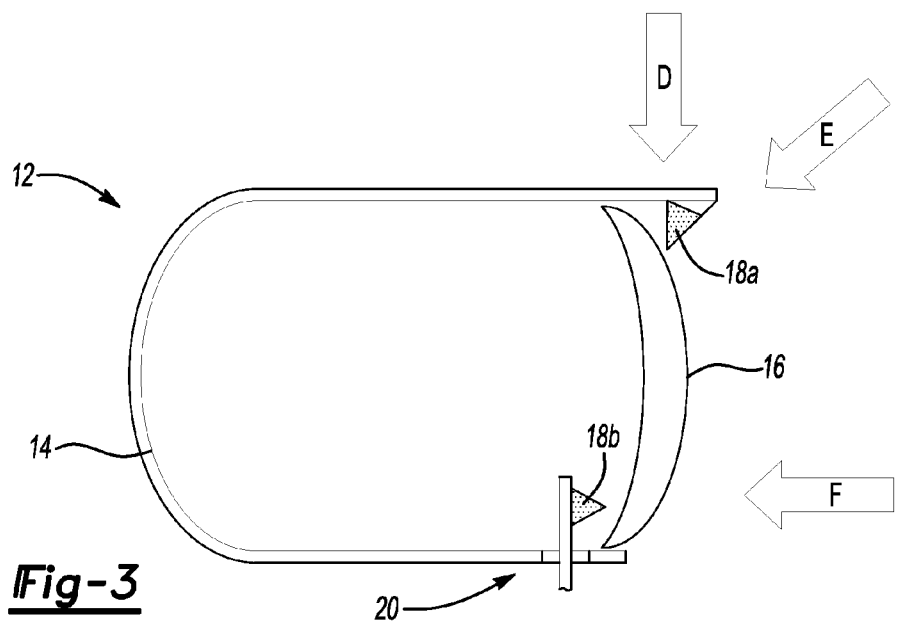
FIG. 3 shows a headlamp assembly according to a second embodiment of the invention.

FIG. 3 shows a headlamp assembly 12 according to another embodiment of the invention. In the illustrated embodiment the headlamp assembly 12 comprises a first protrusion 18$a$ provided directly on its housing 14 at a location in front of the lens 16, whereby part of the housing 14 extends past the front of the lens 16, and a second protrusion 18$b$ provided on a component, such as a flange 20, which is mounted behind the lens 16 on a component located outside the housing 14. In the event of a collision, the protrusion 18$a$ is arranged to be pushed against the front/outer surface of the lens 16 when the housing 14 is subjected to an impact or compression force in the generally lateral and/or rearward directions, for example as indicated by block arrows D and/or E.

The back/inner surface of the lens 16 is arranged to be pushed against protrusion 18$b$ when the lens 16 is subjected to an impact or compression force in a generally rearward direction, for example as indicated by block arrow F. It should be noted that protrusions 18 may be arranged to be pushed against any part of a lens 16 including its upper and lower side surfaces and any part of a lens 16 may be arranged to be pushed against a protrusion 18 located anywhere in the vicinity of the lens 16.

It should be noted that the deformation/breakage of a lens may be arranged to subsequently initiate the deformation/breakage of the housing of a headlamp assembly or vice versa, the deformation/breakage of the housing of a headlamp assembly may be arranged to subsequently initiate the deformation/breakage of the lens. Furthermore, the lens and housing of a headlamp assembly according to the present invention may deform/break at substantially the same time.

Figure 4:
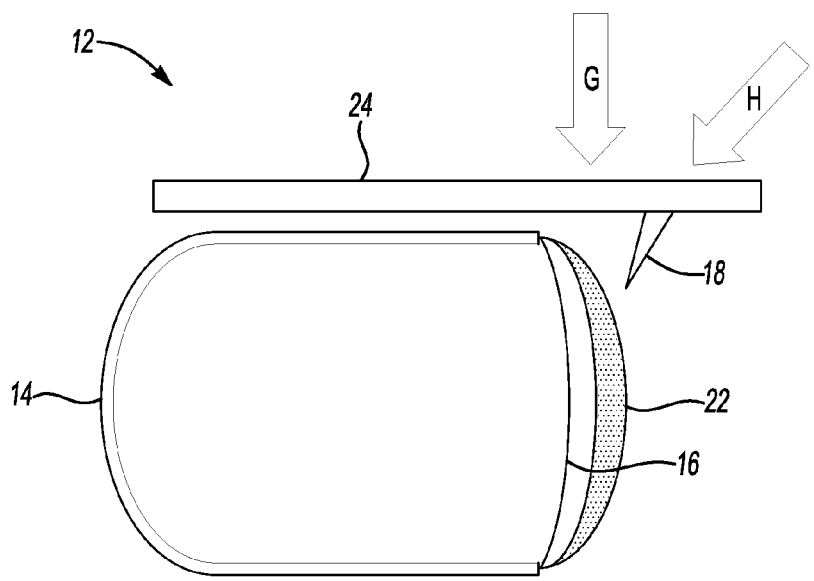
FIG. 4 shows a vehicle component of a vehicle according to an embodiment of the invention.

FIG. 4 shows a headlamp assembly 12 in which the lens 16 comprises at least one continuous, non-uniform film, layer or coating 22 on at least part of its front/outer surface, which is arranged to prevent parts of a broken lens from being scattered when the headlamp assembly or the lens is subjected to an impact or compression force. The film, layer or coating 22 may additionally or alternatively be provided on at least part of the back/inner surface of the lens 22 or between layers of material constituting the lens 16, i.e. between its front and back layer of the lens 16. It should be noted that the at least one film, layer or coating 22 may be arranged to extend beyond the outer boundaries of the lens 16 and be attached to the housing 14 or some other component in the vicinity of the lens 16.

FIG. 4 also shows a vehicle component 24, such as a hood or a fender, that is located in the vicinity of the lens 16, and that comprises a protrusion 18 that is positioned relative to the headlamp assembly 12 to be pushed against the front surface of the lens 16 when the vehicle component 24 is subjected to an impact or compression force in the lateral and/or rearward directions, for example as indicated by block arrows D and/or E, when a pedestrian is thrown onto the hood of a vehicle for example.

Figure 5:
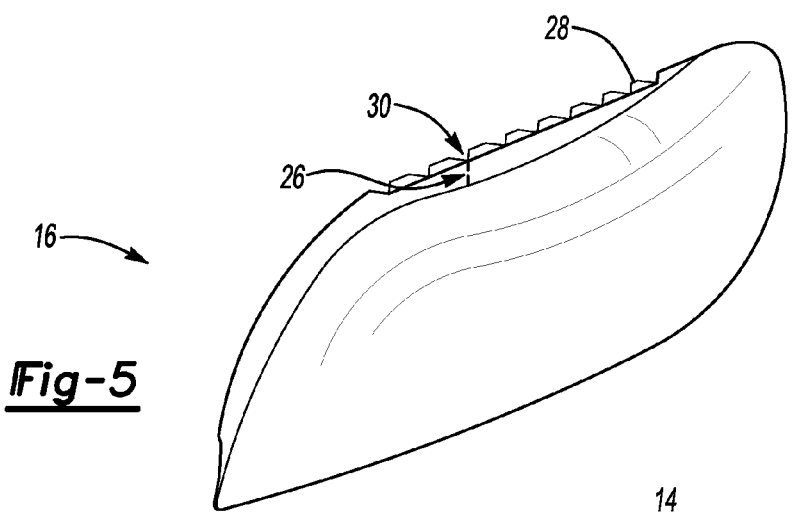
FIG. 5 shows a lens according to an embodiment of the invention.

FIG. 5 shows a lens 16 according to an embodiment of the invention. The lens 16 comprises at least one break line 26. The lens 16 is mounted to a headlamp housing so that at least one protrusion will be located in the vicinity of the at least one break line 26 to initiate breakage of the lens 16 along the break line 26. A break line 26 may of course extend from one side of the lens 16 to the other.

The lens 16 also includes a flange 28, such as a glue flange, which comprises at least one groove 30 that is arranged to receive the at least one protrusion if/when the headlamp assembly is subjected to an impact or compression force in the event of a collision.

Figure 6:
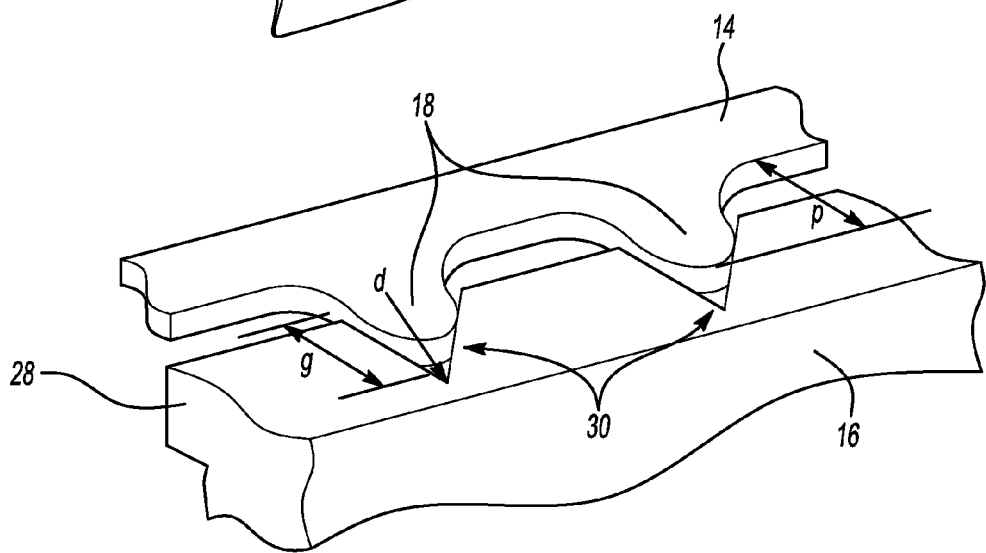
FIG. 6 shows part of a headlamp assembly according to an embodiment of the invention It should be noted that the drawings have not necessarily been drawn to scale and that the dimensions of certain features may have been exaggerated for the sake of clarity.

FIG. 6 shows a plurality of protrusions 18, on a headlamp housing 14 for example, and a plurality of grooves 30, on the glue flange 28 of a lens 16 for example. According to an embodiment of the invention the at least one groove 30 and the at least one protrusion 18 each have a maximum extension measured along the direction in which the protrusion 18 is pushed in the event of a collision, and the maximum extension or depth g of the at least one groove 30 is smaller than the maximum extension p of the at least one protrusion 18 to initiate breakage of the lens 16 when the at least one protrusion 18 is pushed into the at least one groove 30. The maximum extension of the at least one groove 30 may for example be up to 3 mm, up to 5 mm or up to 10 mm or more. It should be noted that a protrusion 28 may be arranged to move through a distance d before it makes contact with a corresponding groove 30. The distance d may be arranged to be 1 to 2 mm, or up to 5 mm.

It should be noted that the at least one protrusion 18 may be provided on a lens 16 and the at least one groove 30 could be provided on the housing 14, or a combination of protrusions 18 and grooves 30 could be provided on both the housing 14 and the lens. All of the protrusions 18 and grooves 30 of a headlamp assembly 12 do not necessarily have to be of the same shape, size and dimensions.

While the best mode for carrying out the invention has been described in detail, those familiar with the art to which this invention relates will recognize various alternative designs and embodiments for practicing the invention as defined by the following claims.

What is claimed:

1. A headlamp assembly for a vehicle comprising:
a housing;
a lens; and
at least one protrusion disposed adjacent the lens such that the lens and the at least one protrusion are urged together when the headlamp assembly is subjected to an impact, the protrusion formed of a rigid material such that contact between the lens and the at least one protrusion results in controlled, non-resilient deformation and/or breakage of the lens wherein the at least one protrusion is disposed on the housing.

2. A headlamp assembly according to claim 1, wherein the lens comprises at least one passive trigger positioned to be engaged by the at least one protrusion when the headlamp assembly is subjected to an impact, the passive trigger contributing to the controlled deformation and/or breakage of the lens.

3. A headlamp assembly according to claim 2, wherein the passive trigger comprises at least one break line.

4. A headlamp assembly according to claim 2, wherein the passive trigger comprises at least one groove formed in the lens.

5. A headlamp assembly according to claim 4, wherein the at least one groove has a first maximum extension and the at least one protrusion has a second maximum extension, and the first maximum extension is smaller than the second maximum extension.

6. A headlamp assembly according to claim 4, wherein the lens comprises a glue flange and the at least one groove is provided on the flange.

7. A headlamp assembly according to claim 1, wherein the lens comprises at least one of a film, a layer and a coating arranged to prevent parts of a broken lens from being scattered when the headlamp assembly or the lens is subjected to the impact.

8. A headlamp assembly according to claim 1, wherein the lens comprises plastic.

* * * * *